(12) United States Patent
Powers

(10) Patent No.: US 7,572,366 B2
(45) Date of Patent: Aug. 11, 2009

(54) METHOD FOR PROCESSING NATURAL GASOLINE

(75) Inventor: Donald H. Powers, Houston, TX (US)

(73) Assignee: Equistar Chemicals, LP, Houston, TX (US)

( * ) Notice: Subject to any disclaimer, the term of this patent is extended or adjusted under 35 U.S.C. 154(b) by 501 days.

(21) Appl. No.: 11/507,414

(22) Filed: Aug. 21, 2006

(65) Prior Publication Data

US 2008/0041767 A1    Feb. 21, 2008

(51) Int. Cl.
*B01D 3/38* (2006.01)
(52) U.S. Cl. ..................................... 208/363
(58) Field of Classification Search ........... 208/46, 208/106, 125, 128, 129, 130, 308, 347, 350, 208/354, 356, 362, 363; 585/700, 734, 738, 585/833
See application file for complete search history.

(56) References Cited

U.S. PATENT DOCUMENTS

| 2,895,909 | A | * | 7/1959 | Strickland | 208/364 |
| 3,445,378 | A | * | 5/1969 | DeGraff | 208/363 |
| 4,578,151 | A | * | 3/1986 | Soderstrom et al. | 208/350 |
| 5,326,926 | A | * | 7/1994 | Rice | 585/738 |

* cited by examiner

*Primary Examiner*—Glenn Caldarola
*Assistant Examiner*—Randy Boyer
(74) *Attorney, Agent, or Firm*—Roderick W. MacDonald

(57) ABSTRACT

A method for rendering a high Reid Vapor Pressure natural gasoline feed suitable for addition to the gasoline pool by using steam stripping conditions that provide an overhead fraction that is suitable for thermal cracking, and a bottoms product that has a substantially reduced Reid Vapor Pressure as compared to the natural gasoline feed.

2 Claims, No Drawings

METHOD FOR PROCESSING NATURAL GASOLINE

BACKGROUND OF THE INVENTION

1. Field of the Invention

This invention relates to the formation of a spark induced automotive engine gasoline fraction having a low Reid Vapor Pressure (RVP). More particularly, this invention relates to the processing of natural gasoline to form a low RVP gasoline fraction.

2. Description of the Prior Art

Natural gasoline is a hydrocarbonaceous liquid that spontaneously condenses from natural gas at ambient conditions of temperature and pressure naturally occurring at the earth's surface. It is predominantly composed of hydrocarbons having from 4 to 9, inclusive, carbon atoms per molecule (C4-C9, inclusive), and has a boiling range of from about 77 to about 430° F. (F).

Reid Vapor Pressure is determined by a well known analytical method for measuring the vapor pressure of petroleum products. Basically, a liquid sample is introduced into a chamber, and then immersed in a bath at 100 F until a constant pressure is observed. It is the difference, or partial pressure, produced by the sample at 100 F pursuant to ASTM test method D.

By today's standards in respect of reduced pollutant emissions from the operation of an automotive engine, natural gasoline is unacceptable in its original form because it has a very high RVP, e.g., often about 13 psi and higher. This high RVP characteristic makes natural gasoline unsuitable for addition, unaltered, to the automotive gasoline pool (gasoline pool) in large volumes.

It is, however, with current tight gasoline supplies, highly desirable to render natural gasoline suitable for addition to the overall gasoline pool in large volumes, and this invention provides just such a procedure.

SUMMARY OF THE INVENTION

In accordance with this invention, there is provided a method for rendering natural gasoline suitable for addition to the gasoline pool in any volume, particularly large volumes, by subjecting the natural gasoline to steam stripping conditions that produce a bottoms product from the steam stripper that has a substantially reduced RVP as compared to the original natural gasoline feed to the stripper.

DETAILED DESCRIPTION OF THE INVENTION

The use of a steam stripper to form an acceptable gasoline bottoms fraction from an unacceptable natural gasoline feed has a number of advantages that are not readily obvious, even to one skilled in the art.

Thermal cracking plants are well known in the art. These plants use cracking furnaces to thermally, and non-catalytically, break down larger hydrocarbon molecules to smaller, sometimes unsaturated, molecules. Such plants are major suppliers of ethylene and propylene. Natural gasoline, in its entirety, is often used as feed to the cracking furnace of a thermal cracking plant. However, it is not desirable to crack the portion of a natural gasoline feed that is already suitable for addition to the gasoline pool. This invention avoids this undesirable use of natural gasoline in that the overhead of the steam stripper of this invention can be used as feed to a thermal cracking plant, but the substantial volume of stripper bottoms produced by this invention is not sent to a cracking plant. Instead, the bottoms of this invention can be sent directly to the gasoline pool or indirectly to the gasoline pool by being utilized as feed to a catalytic reformer in a crude oil refinery.

Due to the clean nature of the bottoms stream of this invention, and the low temperatures used for the steam stripping operation, the process of this invention is uniquely simple and compact. Conventional distillation trays could, if desired, be used in the stripper, and the overhead from the stripper could be used to feed more than one thermal cracking furnace.

Capital and energy costs for this invention versus conventional thermal distillation are greatly reduced in this invention due to the fact that reboilers and condensers are not required. Further, the energy used to make the overhead/bottoms separation of this invention is energy that would be required for the cracking furnace anyway.

Thus, this invention provides a plurality of unique advantages, particularly, when coupled with a thermal cracking process.

By steam stripping natural gasoline to form a light fraction that contains predominantly C4's and C5's (with, for example, minor amounts of C6's and heavier), an overhead (light) fraction is formed that is very desirable as a thermal cracking furnace feed. At the same time a bottoms fraction that contains predominantly C6 and heavier hydrocarbons, e.g., C7's and C8's, (with, for example, minor amounts of C4's and C5's) is formed that is, because of its greatly reduced RVP, highly desirable as a gasoline fraction in any volume, even under today's rigid environmental requirements.

The cut between the overhead and bottoms stream of this invention can vary widely depending on the particular stripping conditions needed for a particular natural gasoline composition, but generally, the overhead fraction will contain at least about 70 weight percent (wt %) of the C4's and C5's that were in the feed, and the bottoms fraction will contain at least about 70 wt % of the C6 and heavier hydrocarbons that were in the feed, all wt % based on the total weight of the feed. The bottoms fraction will be a substantial part of the total of the original natural gasoline feed, e.g., at least about 30 wt % of the original feed, based on the total weight of that original feed.

The natural gasoline feed will have an original RVP of at least about 10 psi. The stripping bottoms fraction of this invention will have an RVP that is very substantially reduced, e.g., at least about 20% below that of the original RVP of the feed.

The stripping conditions pursuant to this invention can also vary widely so long as the desired RVP reduction for the bottoms fraction is achieved, but generally the overhead temperature for the stripper will be from about 70 to about 200 F at a pressure of from about 10 to about 100 psig. The steam as introduced into the stripper will be from about 250 to about 1,000 F at a pressure of from about 10 to about 100 psig. To achieve the results of this invention, the steam to natural gasoline feed ratio will be from about 0.1 to about 0.4 pounds of steam per pound of natural gasoline feed, a surprisingly low energy requirement.

EXAMPLE

Bellvieu natural gasoline having an RVP of about 13 is subjected to steam stripping. Steam at about 345 F and about 95 psig is introduced into the stripper at a rate of 0.2 pounds of steam per pound of natural gasoline feed. The stripper is maintained at an internal pressure of about 60 psig. The overhead fraction (stream) from the stripper is at about 165 F, while the bottoms fraction is at about 113 F, an unusual result. The bottoms fraction constitutes about 38 wt % of the natural gasoline feed based on the total weight of that feed.

The overhead fraction of the stripper contains about 85 wt % of a mixture of C4's and C5's, the remainder being made up primarily of C6's and C7's, based on the total weight of that overhead fraction.

The bottoms fraction of the stripper contains about 80 wt % of C6's through C9's, the remainder being made up primarily of C4's and C5's, based on the total weight of the bottoms fraction, and has an RVP of about 6.75 psi.

I claim:

1. A method for rendering natural gasoline feed suitable for addition to the gasoline pool which comprises providing a source of natural gasoline, subjecting said natural gasoline to steam stripping under conditions of temperature, pressure, and steam/feed ratios which produce an overhead fraction from said feed that contains predominantly C4 and C5 hydrocarbons and a separate bottoms fraction from said feed that contains predominantly C6 and heavier hydrocarbons, said stripping conditions being a stripper overhead temperature of from about 70 to about 200 F at a pressure of from about 10 to about 100 psig, a steam temperature as introduced into said stripper of from about 250 to about 1,000 F at a pressure of from about 10 to about 100 psig, and an introduced steam to natural gasoline feed ratio of from about 0.1 to about 0.4 pounds of steam per pound of natural gasoline feed, said bottoms fraction having a Reid Vapor Pressure substantially lower than said natural gasoline feed, and feeding said overhead fraction to at least one thermal cracking furnace.

2. The method of claim 1 wherein said natural gasoline feed has an original Reid Vapor Pressure of at least about 10 psi, and said bottoms fraction has a Reid Vapor Pressure at least about 20% below said original Reid Vapor Pressure.

* * * * *